United States Patent [19]

Cale

[11] 4,385,990
[45] May 31, 1983

[54] SEPARATOR FOR HONEY AND WAX

[75] Inventor: David B. Cale, Hamilton, Ill.

[73] Assignee: Dadant & Sons Inc., Hamilton, Ill.

[21] Appl. No.: 335,552

[22] Filed: Dec. 29, 1981

[51] Int. Cl.³ .............................................. B01D 35/18
[52] U.S. Cl. ..................................... 210/187; 210/513
[58] Field of Search ............... 210/187, 182, 513, 184, 210/532

[56] References Cited

U.S. PATENT DOCUMENTS

| 2,248,893 | 7/1941 | Parent | 210/187 |
| 2,520,304 | 8/1950 | Brand | 210/187 |
| 3,448,860 | 6/1969 | Eckdahl | 210/187 X |

Primary Examiner—Frank A. Spear, Jr.
Attorney, Agent, or Firm—Fred Philpitt

[57] ABSTRACT

The present invention relates to a device for treating combs from beehives so as to separate the honey from the beeswax.

1 Claim, 2 Drawing Figures

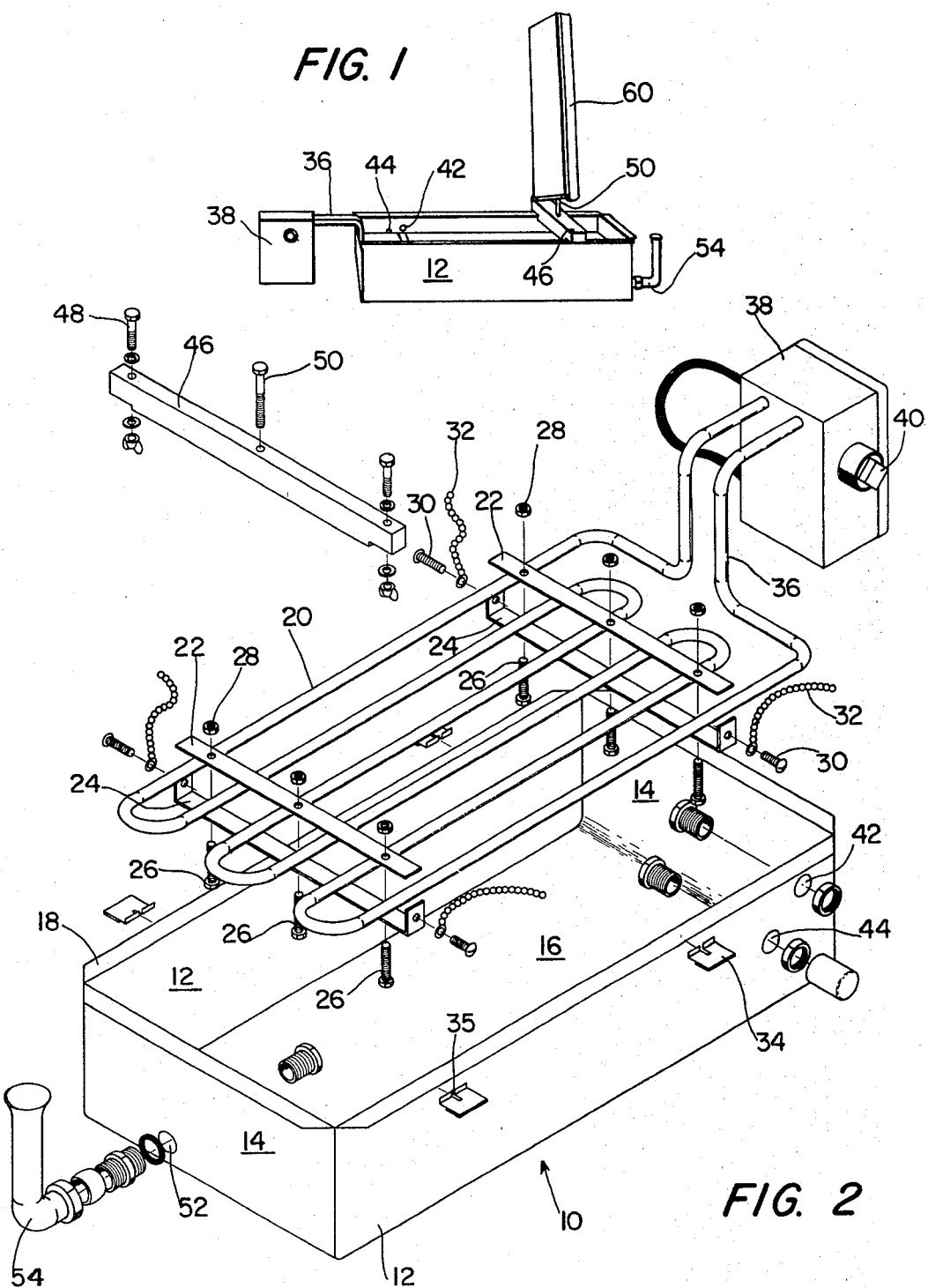

SEPARATOR FOR HONEY AND WAX

BACKGROUND

When beekeepers are ready to harvest honey from a beehive they frequently want to separate the honey from the beeswax in a quick and efficient manner. The object of the present invention is to provide a small portable unit which will permit this.

THE PRESENT INVENTION

Considered from one aspect the present invention pertains to a device for separating beeswax and honey which includes:
  (a) an open-topped container having a bottom and upstanding sidewalls,
  (b) a heating means including
    (1) a sinuous heating coil generally disposed in a horizontal plane,
    (2) a heat control means attached to said heating means, and
    (3) means interconnecting said heating coil and said heat control means,
  (c) support means for supporting said sinuous heating coil within said container sidewalls and intermediate the top and bottom of said container, said heat control means being located outside the perimeter of said container,
  (d) at least one outlet for melted beeswax located in one sidewall of said container, and
  (e) an outlet for liquid honey located in a sidewall of said container, said honey outlet being located closer to the bottom of the container than said melted beeswax outlet.

The invention will be better understood by referring to the drawing wherein:

FIG. 1 is an exterior perspective view of the device of the present invention; and FIG. 2 is an enlarged exploded view of the device shown in FIG. 1.

Referring now to the drawings, the device of this invention first of all includes an open top container 10 having a bottom 16 and upstanding side walls 12 and 14. In the embodiment shown in the drawings the container is of generally rectangular shape although any other suitable shapes may be used. Also, in the embodiment shown the length and width of the container 10 are preferably greater than the depth of the container. The upper perimeter of the container 10 is shown as being provided with outwardly extending flange sections 18 that are generally parallel with the bottom 16 of the container 10.

The device of this invention also includes a heating means. This heating means includes a sinuous heating coil 20 that winds back and forth and is disposed in a generally horizontal plane i.e. disposed generally parallel to the bottom 16 of the container 10. The drawing also shows a heat control means 39 that includes means for controlling the electrical heat input to the heating coil. The heat control means 38 is connected to the sinuous heating coil 20 by a cold leg section 36, this cold leg containing no resistance element so that it in effect can function as a handle to lift the heating coil section in and out of the container 10. The heating coil 20 has imbedded therein electrical resistance elements so that when electrical current is applied thereto the coils will become heated.

The device of this invention further includes support means for supporting the sinuous heating coil 20 at the desired position within said container sidewalls 12 and 14 and at a position intermediate the open top and the closed bottom 16 of the container 10. This support means could take a number of different forms but as shown it consists of members 22 and 24 that can be attached together by bolts 26 and nuts 28 so that members 22 and 24 effectively clamp the heating coil therebetween. The lateral ends of members 24 are provided with holes as shown which are adapted to receive a bolt or screw 30. The lower end of flexible chain 32 fits over the bolt 30 so that the lower end of the chain 32 is in effect secured to the support member 24. The upper end of chain 32 is adapted to engage the slot 35 located in the clip members 34. Clip members 34 are adapted to be slideably engaged with the outwardly extending flange 18 in such a manner that the slot 35 in the clip member 34 is disposed over the inside of the tank 10 where it can be engaged with any desired link of the chain 32. Thus, by varying which link of the chain 32 goes into the slot 35 of clip 34, the position (level) of the heating coil in the container 10 may be varied.

At least one outlet for melted beeswax is provided in one of the side walls of the container. In the embodiment shown in the drawings two such outlets 42 and 44 are provided. Outlets 42 and 44 are shown as being at different heights above the bottom 16 of the container so that the level at which the melted beeswax is withdrawn can be varied. When the melted beeswax is to be withdrawn from outlet 42 then a cap is placed over the lower outlet 44.

The container is also provided with an outlet 54 for liquid honey, this outlet being located in a sidewall of the container. The honey outlet 54 is located closer to the bottom of the container 10 than either of the melted beeswax outlets 42 or 44. The outlet 54 is preferably constructed so that the liquid honey in the lower portion of the container 10 can be withdrawn at any desired level. As shown, the outlet 54 is in the form of a "swivel" outlet so that by simply turning the L-shaped tube 54 the level at which the liquid honey is withdrawn can be raised or lowered.

The device of this invention also preferably includes a crossbar 46 (wooden or plastic) that is adapted to be clamped at its ends by bolts 48 and wing nuts to the flange 18 of the container. Intermediate the ends of this crossbar is a latch screw 50 that is only partially threaded into the crossbar so that is provides an upstanding post. As is seen in FIG. 1 this crossbar 46 and post 50 facilitate positioning of a frame 60 containing a honeycomb above the device. As is indicated in FIG. 1 when the user of the device scrapes the comb from the frame 60 the comb will drop downwardly into the open-topped container, and upon encountering the heating coil 20 the beeswax will melt and the viscosity of the honey will be lowered, with the result that a lower honey layer and an upper layer of melted beeswax are formed.

The device of this invention allows the beekeeper maximum versatility by providing adjustable honey withdrawal heights, adjustable heating grid heights and two levels at which the melted beeswax may be withdrawn. The objective is to melt the beeswax that is near the top of the container without overheating the honey on the bottom.

In operation the heating means may be plugged into a 110-120 grounded outlet. The frames containing the honeycomb are uncapped using the crossbar 46 to support the frame above the container 10. The temperature of the coil is preferably set at about 180° by manipulation of the control box 38.

Based upon the user's volume, one of the wax outlets is chosen. The height of the heating coil is placed at a level approximating the level of the chosen wax outlet (i.e. 42 or 44). The honey outlet 54 is then adjusted so that the upper level of the honey height will be approximately ¾ inch below the level of the heating coil 20.

At the end of the operation all of the honey possible should be drained out of the container taking care not to drain slum into the honey. The heating means is then unplugged and the heating coil removed. The grid should then be cleaned with hot water and when necessary some light scraping.

Since there are no moving parts very little maintenance is necessary.

The heating means is preferably associated with a thermostat which will register the temperature in or adjacent to the heating coils. The temperature adjustment means for the heat is preferably arranged so that it can be set to any temperature within the range of about 60° to 250° F. For a grid which is about 10 inches in total width and 23 inches in length, a 1750 watt heating means has been found to be quite satisfactory.

Any known means may be employed for sensing the temperature in the wax and/or honey so that the heat input to the grid can be increased, decreased or maintained the same. A thermocouple on the grid and a thermostatic control associated with heat control 38 would be an inexpensive example of such means.

I claim:

1. A device for separating beeswax and honey which comprises in combination:
    (a) an open-topped rectangular container having a bottom and upstanding sidewalls, the upper perimeter of said container being provided with outwardly extending flange sections (18) that are generally parallel with the bottom (16) of the container,
    (b) a heating means including
        (1) a sinuous electrical heating coil section (20) generally disposed in a horizontal plane generally parallel to the bottom (16) of the container,
        (2) a heat control means (38) attached to said electrical heating coil for controlling the electrical heat input to the heating coil,
        (3) said heat control means (38) being connected to said heating coil (20) by a cold leg section (36), said cold leg section containing no resistance element so that it in effect can function as a handle to lift the heating coil section in and out of said container,
    (c) support means for supporting said sinuous electrical heating coil section at the desired position within said container sidewalls and intermediate the top and bottom of said container, said support means including:
        (1) two sets of coil clamping members (22,24) that extend across spaced apart portions of said heating coil section (20) and generally perpindicular thereto,
        (2) a flexible chain (32) extending between each end of each set of coil clamping members (22,24) and an anchor point on the nearest sidewall (12), whereby by selection of a link in said flexible chain (32) to engage an anchoring point (34, 35) the height of the heating coil section (20) above the bottom of the container can be varied,
    (d) at least one outlet for melted beeswax located in one sidewall of said container, and
    (e) an outlet for liquid honey located in a sidewall of said container, said honey outlet being located closer to the bottom of the container than said melted beeswax outlet.

* * * * *